United States Patent
Belton, Jr.

(10) Patent No.: US 11,658,873 B1
(45) Date of Patent: *May 23, 2023

(54) INTELLIGENT LEARNING AND MANAGEMENT OF A NETWORKED ARCHITECTURE

(71) Applicant: WELLS FARGO BANK, N.A., San Francisco, CA (US)

(72) Inventor: Lawrence T. Belton, Jr., Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,964

(22) Filed: Jul. 21, 2022

Related U.S. Application Data

(63) Continuation of application No. 17/018,788, filed on Sep. 11, 2020, now Pat. No. 11,438,228, which is a
(Continued)

(51) Int. Cl.
*H04L 41/0823* (2022.01)
*H04L 12/28* (2006.01)
(Continued)

(52) U.S. Cl.
CPC ......... *H04L 41/0823* (2013.01); *G06N 20/00* (2019.01); *H04L 12/2814* (2013.01);
(Continued)

(58) Field of Classification Search
CPC ............. H04L 41/0823; H04L 12/2814; H04L 12/4675; H04L 41/04; H04L 41/0654;
(Continued)

(56) References Cited

U.S. PATENT DOCUMENTS

| 5,649,064 A | 7/1997 | Jorgensen et al. |
| 7,720,940 B1 | 5/2010 | Wilsey et al. |

(Continued)

FOREIGN PATENT DOCUMENTS

WO  2017127850 A1  7/2017

OTHER PUBLICATIONS

Kephart et al., "The Vision of Autonomic Computing", Computer, Jan. 2003, pp. 41-50, vol. 36, No. 1, IEEE Computer Society.
(Continued)

*Primary Examiner* — Michael Won
(74) *Attorney, Agent, or Firm* — Kilpatrick Townsend & Stockton LLP

(57) ABSTRACT

Intelligent learning and management of networked architectures is disclosed. A network architecture can be mapped to identify a set of interconnected hardware and software elements that comprise the network architecture. Data sources associated with the set of interconnected hardware and software elements can be identified and employed to compile data associated with the elements. The data can be utilized to determine an action to address potential negative effects of a change to the network architecture such as an update or patch. In one instance, the action corresponds to a reconfiguration of at least one of the set of interconnected hardware and software elements. Further, machine learning can be employed to determine a particular configuration. Once determined the action can be implemented on the network architecture.

20 Claims, 6 Drawing Sheets

Related U.S. Application Data continuation of application No. 16/014,688, filed on Jun. 21, 2018, now Pat. No. 10,785,108.

(51) Int. Cl.

| | |
|---|---|
| *H04L 41/0803* | (2022.01) |
| *H04L 41/5054* | (2022.01) |
| *H04L 41/08* | (2022.01) |
| *H04L 41/085* | (2022.01) |
| *H04L 67/00* | (2022.01) |
| *G06N 20/00* | (2019.01) |
| *H04L 41/0654* | (2022.01) |
| *H04L 12/46* | (2006.01) |
| *H04L 67/53* | (2022.01) |
| *H04L 41/0806* | (2022.01) |
| *H04L 41/04* | (2022.01) |
| *H04L 41/16* | (2022.01) |

(52) U.S. Cl.
CPC .......... *H04L 12/4675* (2013.01); *H04L 41/04* (2013.01); *H04L 41/0654* (2013.01); *H04L 41/08* (2013.01); *H04L 41/0803* (2013.01); *H04L 41/085* (2013.01); *H04L 41/0806* (2013.01); *H04L 41/0876* (2013.01); *H04L 41/16* (2013.01); *H04L 41/5054* (2013.01); *H04L 67/34* (2013.01); *H04L 67/53* (2022.05)

(58) Field of Classification Search
CPC . H04L 41/08; H04L 41/0803; H04L 41/0806; H04L 41/085; H04L 41/0876; H04L 41/16; H04L 41/5054; H04L 67/34; H04L 67/53; G06N 20/00
See application file for complete search history.

(56) References Cited

U.S. PATENT DOCUMENTS

| | | |
|---|---|---|
| 7,802,246 B1 | 9/2010 | Kennedy et al. |
| 7,861,252 B2 | 12/2010 | Uszok et al. |
| 8,355,905 B2 | 1/2013 | Fokoue-Nkoutche et al. |
| 8,438,559 B2 | 5/2013 | Naslavsky et al. |
| 8,613,096 B2 | 12/2013 | Peinado et al. |
| 8,930,937 B2 | 1/2015 | McCaleb et al. |
| 9,146,727 B2 | 9/2015 | Arcese et al. |
| 9,443,192 B1 | 9/2016 | Cosic |
| 9,565,059 B1* | 2/2017 | Manmohan ............ H04L 63/20 |
| 9,665,713 B2 | 5/2017 | Avasarala et al. |
| 10,439,875 B2 | 10/2019 | Mohanram |
| 10,554,493 B2 | 2/2020 | Kompella et al. |
| 10,560,328 B2 | 2/2020 | Mohanram et al. |
| 10,686,669 B2 | 6/2020 | Nagarajan et al. |
| 10,891,282 B1* | 1/2021 | Willingham ............ G06F 21/64 |
| 11,126,610 B1* | 9/2021 | Deshpande ......... G06F 16/2365 |
| 2003/0172139 A1* | 9/2003 | Srinivasan ............ H04L 67/02 709/248 |
| 2004/0249914 A1 | 12/2004 | Flocken et al. |
| 2006/0277533 A1 | 12/2006 | Fiske |
| 2007/0192863 A1 | 8/2007 | Kapoor et al. |
| 2009/0182605 A1 | 7/2009 | Lappas et al. |
| 2009/0222540 A1 | 9/2009 | Mishra et al. |
| 2011/0143743 A1 | 6/2011 | Pollakowski et al. |
| 2011/0276685 A1 | 11/2011 | De Waal et al. |
| 2012/0158395 A1 | 6/2012 | Hughes et al. |
| 2014/0059535 A1 | 2/2014 | Gocek et al. |
| 2014/0279808 A1 | 9/2014 | Strassner |
| 2015/0082296 A1 | 3/2015 | Thomas et al. |
| 2015/0120651 A1* | 4/2015 | Rajbhandari ....... H04L 67/1095 707/610 |
| 2015/0242637 A1 | 8/2015 | Tonn et al. |
| 2015/0288569 A1 | 10/2015 | Agarwal et al. |
| 2016/0078368 A1 | 3/2016 | Kakhandiki et al. |
| 2016/0085772 A1* | 3/2016 | Vermeulen ............. G06F 16/21 707/615 |
| 2016/0124839 A1* | 5/2016 | Mordo ................ G06F 11/3664 717/124 |
| 2016/0179850 A1 | 6/2016 | Martin et al. |
| 2016/0216706 A1 | 7/2016 | Christensen et al. |
| 2016/0248636 A1* | 8/2016 | Filatov .................... H04L 41/22 |
| 2016/0259635 A1 | 9/2016 | El Maghraoui et al. |
| 2017/0161758 A1 | 6/2017 | Towriss |
| 2017/0178093 A1 | 6/2017 | Bull et al. |
| 2017/0212829 A1 | 7/2017 | Bales et al. |
| 2017/0237616 A1 | 8/2017 | Akella et al. |
| 2017/0310546 A1 | 10/2017 | Nair et al. |
| 2017/0353991 A1 | 12/2017 | Tapia |
| 2018/0027066 A1 | 1/2018 | Van De Groenendaal et al. |
| 2018/0285777 A1 | 10/2018 | Li et al. |
| 2019/0014153 A1 | 1/2019 | Lang et al. |
| 2019/0052531 A1 | 2/2019 | Sividia et al. |
| 2019/0116153 A1 | 4/2019 | Deverakonda Venkata et al. |
| 2019/0158606 A1 | 5/2019 | Guim Bernat et al. |
| 2019/0236485 A1 | 8/2019 | Stanley, III et al. |
| 2019/0244129 A1 | 8/2019 | Tabuchi et al. |
| 2019/0245743 A1 | 8/2019 | A et al. |
| 2019/0279044 A1 | 9/2019 | Vasisht et al. |
| 2020/0052884 A1* | 2/2020 | Tong .................... H04L 9/3247 |
| 2020/0201910 A1 | 6/2020 | Gavaudan et al. |
| 2020/0272618 A1 | 8/2020 | Hughes |
| 2021/0004225 A1* | 1/2021 | Karunakaran ............. G06F 8/60 |
| 2021/0144517 A1 | 5/2021 | Guim Bernat et al. |
| 2021/0240498 A1* | 8/2021 | Padmanabhan ..... G06F 16/2246 |

OTHER PUBLICATIONS

Naone, "Software That Fixes Itself", MIT Technology Review, Oct. 29, 2009, 4 pages.

\* cited by examiner

INTELLIGENT LEARNING AND MANAGEMENT OF A NETWORKED ARCHITECTURE

CROSS-REFERENCE TO RELATED APPLICATIONS

This application is a continuation of and claims priority to U.S. patent application Ser. No. 17/018,788, filed Sep. 11, 2020, and entitled "INTELLIGENT LEARNING AND MANAGEMENT OF A NETWORKED ARCHITECTURE," which is a continuation of and claims priority to U.S. application Ser. No. 16/014,688, filed Jun. 21, 2018, issued as U.S. Pat. No. 10,785,108, and entitled "INTELLIGENT LEARNING AND MANAGEMENT OF A NETWORKED ARCHITECTURE," the entirety of both of which are incorporated herein by reference.

BACKGROUND

Networks are becoming more complex and more distributed, especially for large corporations or financial institutions. The networks continuously are adding network elements to the network that have different configurations, security policies, access policies, and/or the like. It is becoming increasingly difficult to manage each element or type of element on a growing network. Especially difficult is managing and learning the best configurations for each element with updates, new policies, and/or the like as each element may come from a different supplier with its own configuration type and update schedule.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Systems and methods are provided associated with intelligent management of a networked architecture. In accordance with one aspect, a method, comprising a number of operations including mapping a network architecture comprising a set of software and hardware elements interconnected in a domain, identifying a change to be made to the network architecture, automatically determining an action to address a conflict, associated with the change, that negatively affects performance of the network architecture, in which the action corresponds to reconfiguration of at least one of the set of software and hardware elements, and implementing the action on the network architecture. In one instance the change can correspond to an update or a patch. The method can further comprise determining a negative impact on functionality of the network architecture associated with the change and automatically determining the action that mitigates the negative impact on the functionality of the network architecture.

According to another aspect, a system is provided that comprises a processor coupled to a memory that stores instructions that, when executed by the processor, cause the processor to perform operations. In particular, the instructions can cause a processor to analyze a network architecture comprising a set of software and hardware elements interconnected in a domain, identify a change to be made to the network architecture, automatically determine an action to address a conflict that negatively affects performance of the network architecture associated with the change, in which the action corresponds to reconfiguration of at least one of the set of software and hardware elements, and implement the action on the network architecture. Further, the instructions can cause the processor to determine identifies associated with elements of the networked architecture, locate data sources associated with the elements based on the identifiers, and compile data from the data sources for the elements. The performance of the networked architecture can be determined by way of machine learning based on compiled data. Further, the action can be determined by way of the machine learning based on the performance of the network architecture.

A method is also provided in accordance with another aspect that comprises executing, on a processor, instructions that cause the processor to perform operations. The operations can include identifying a set of interconnected software and hardware elements comprising a network architecture, identifying an update to at least one of the set of interconnected software and hardware elements, automatically determining an action to avoid negative impact on functionality of the network architecture associated with the update, wherein the action corresponds to configuration of at least one of the set of interconnected software and hardware elements, and implementing the action on the network architecture. In one instance, the operations further comprise identifying one or more data sources associated with the set of interconnected software and hardware elements, compiling data the one or more data sources, and determining functionality associated with the network architecture by way of machine learning based on the data. Further, the action can be determined by way of machine leaning based on the data.

Aspects of the subject disclosure include substantial benefits in terms of learning an environment and a networked architecture. One advantage resides in a learned understanding of the best configuration for elements in a networked architecture. Another advantage resides in automatically executing the best configuration for elements in a networked architecture.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings.

DETAILED DESCRIPTION

Figure 1:
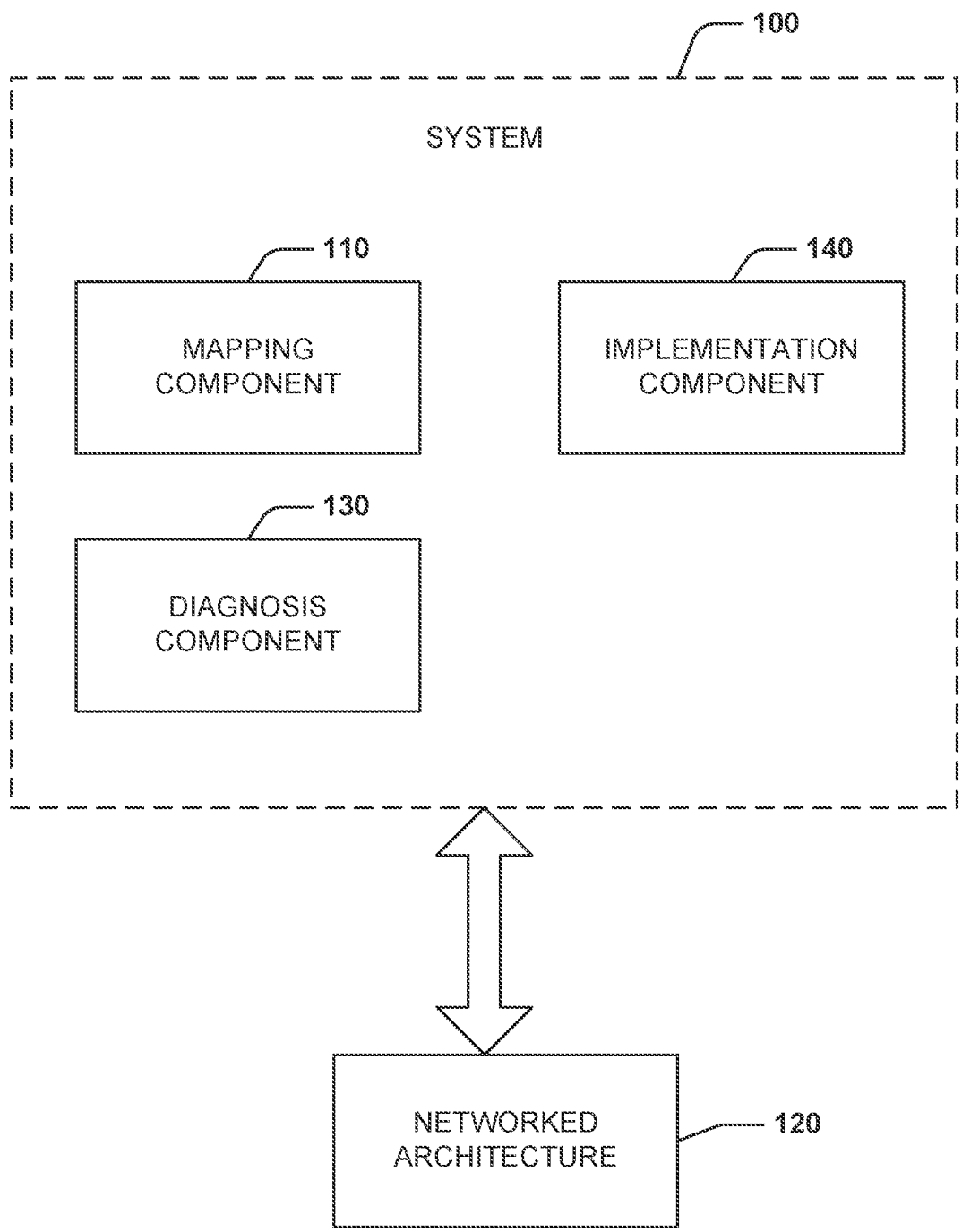
FIG. 1 illustrates an example component diagram of a system of the present innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 1 illustrates a system 100 for intelligent learning and management of networked architectures. The system 100 includes a mapping component 110. The mapping component 110 maps a networked architecture 120. In some embodiments, the networked architecture 120 includes elements interconnected in a common environment. The elements can include software elements, hardware elements, and/or the like. The environment can be a distributed system, open network, closed network, local area network, and/or the like through which data and/or network traffic traverses to connect the elements.

The mapping component 110 determines a set of elements of the networked architecture 120. In some embodiments, each element of the set of elements includes a unique identifier and/or a type identifier to distinguish elements on the networked architecture 120. For example, a software element may be unique to a specific device but also have server copies of the same software elements on multiple devices in the environment. The unique identifier can indicate the element on the specific device and the type identifier can indicate all copies installed of the same software element. In some embodiments, a unique identifier is a serial number, MAC address, IP address, network name, and/or the like. In some embodiments, the type identifier is product name, brand name, model number, workgroup, and/or the like.

The mapping component 110 determines data sources associated with the set of elements using the identifiers. In some embodiments, the data sources can be system behaviors, human behaviors, internet databases, intranet databases, and/or the like. System behaviors can be how the system is performing (e.g. underperforming, faults, blind spots, performance metrics, and/or the like). Human behaviors can include instances when the system 100 has failed to determine a configuration for the environment and therefore needed human intervention to determine a best configuration. In some embodiments, human behaviors can be recorded interactions with the elements that indicate inefficiencies to remedy through a new configuration.

Internet databases can be found using the unique identifier and/or type identifier to direct the mapping component 110 to websites, online manuals, product information databases, and/or the like. The internet databases can have information such as version logs, change logs, patches, updates, support information, end-of-life tracking, and/or the like. In some embodiments, the internet database can indicate alternative elements to the elements currently being employed by the networked architecture 120. Intranet databases can include information managed by a system administrator and/or the like to include best practices for a company, internal rules, preferred vendors, client preferences, security requirements, government requirements, and/or the like.

The mapping component 110 compiles data associated with the set of elements from the determined data sources. The mapping component 110 analyzes information from the compiled data to facilitate determining the configuration. For example, the mapping component 110 can analyze the compiled data to determine what updates are needed for a set of elements. In some embodiments, the mapping component 110 can learn from the analyzed information for future configuration decisions using machine learning techniques, artificial intelligence, deep learning intelligence, and/or the like.

The system 100 includes a diagnosis component 130. The diagnosis component 130 determines a configuration for at least one element in the environment based on the mapping. In some embodiments, the diagnosis component 130 determines a configuration for the entire environment. The diagnosis component 130 utilizes the analysis of the compiled data from the mapping component 110 to determine and/or generate the configuration.

The system 100 includes an implementation component 140. The implementation component 140 executes based on the configuration. The implementation component 140 can perform actions that change or alter the configuration of an element. The implementation component 140 can perform installation, uninstallation, replacement, updates, tune settings, other configuration functions, and/or the like. The implementation component 140 receives the configuration from the diagnosis component 130. The implementation component 140 extracts the different functions to be applied to each element in the system architecture on the environment from the configuration. In some embodiments, the implementation component 140 can organize the functions and/or order of functions to optimize execution of the configuration for the environment.

In some embodiments, the diagnosis component 130 determines a known configuration of at least one element in the set of elements from the learned information. The implementation component 140 deploys the known configuration to the element in the environment.

In other embodiments, the diagnosis component 130 determines one or more sub-configurations for different elements in the environment. The diagnosis component 130 compiles the sub-configurations into a batched configuration for the set of elements. The implementation component 140 deploys the batched configuration to the set of elements in the environment.

In some embodiments, the diagnosis component 130 determines an application ledger for a subset of elements of the set of elements. The application ledger is a distributed ledger and/or the like. For example, the application ledger can be a hashgraph or blockchain ledger. The application ledger can document previous or special configurations of an element in the environment. From the ledger, the diagnosis component 130 determines unnecessary configurations based on the application ledger of the subset of elements. The diagnosis component 130 can block the unnecessary configuration for a specific element from the finalized configuration to be executed by the implementation component 140. For example, the mapping component 110 has determined a new version of a software element; however, the software element has a custom configuration recently deployed to the software element. The application ledger of the element shows that the configuration has been customized and therefore the diagnosis component 130 determines that the version of the software element should not be included in the final configuration.

Figure 2:
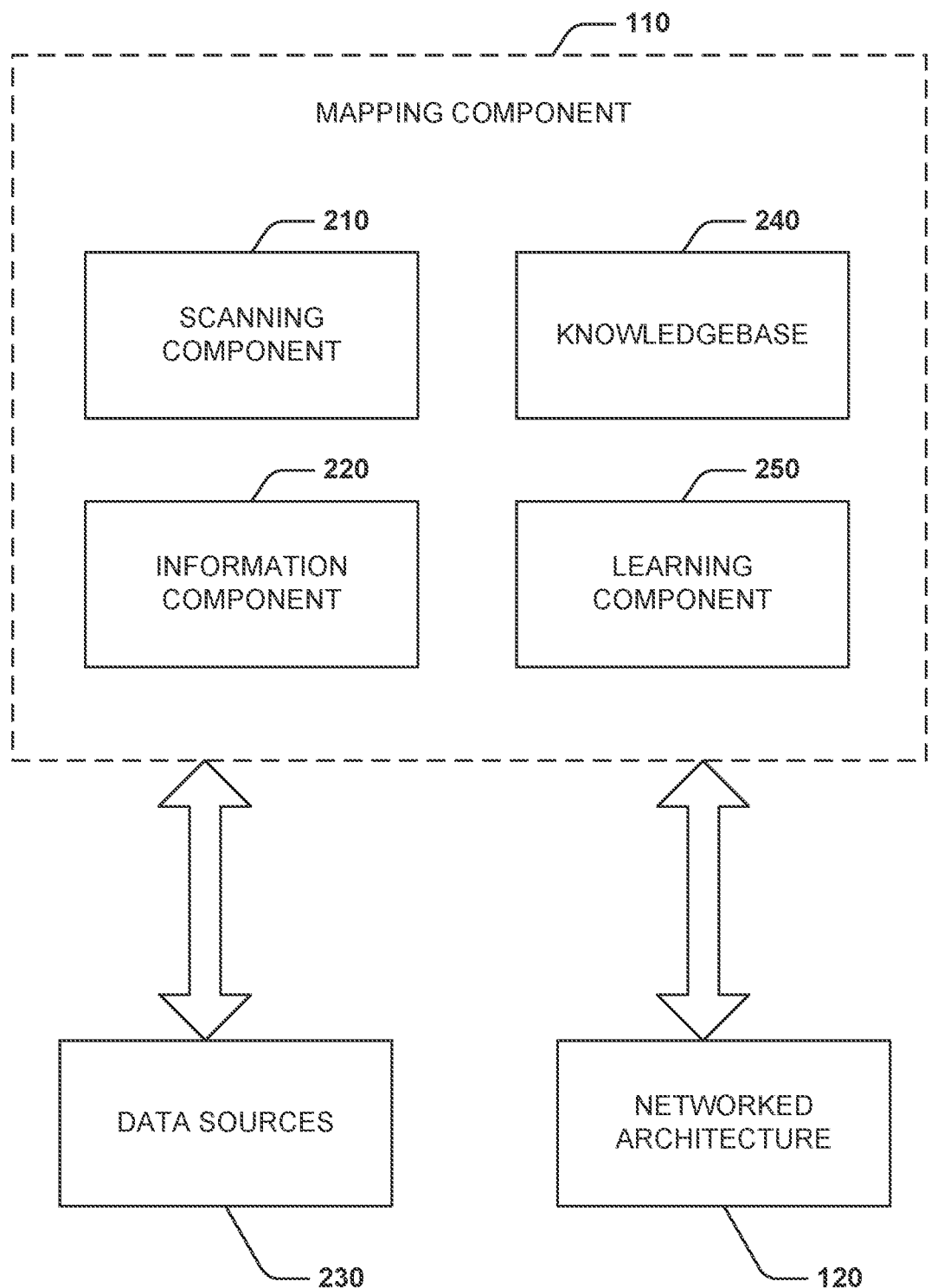
FIG. 2 illustrates an example component diagram of a mapping component.

FIG. 2 illustrates a detailed component diagram of the mapping component 110. The mapping component 110 includes a scanning component 210. The scanning component 210 scans the networked architecture 120 of the environment. The scanning component 210 generates a map of the networked architecture 120 having elements in the environment. The elements can include software elements and hardware elements. The environment can be a distributed system, open network, closed network, local area network, and/or the like through which data and/or network traffic traverses to connect the elements.

The scanning component 210 determines a set of elements of the networked architecture 120. In some embodiments, each element of the set of elements includes a unique identifier and/or a type identifier to distinguish elements on the networked architecture 120. For example, a software element may be unique to a specific device but also have server copies of the same software elements on multiple devices in the environment. The unique identifier can indicate the element on the specific device and the type identifier can indicate all copies installed of the same software element.

The mapping component 110 includes an information component 220. The information component 220 determines data sources 230 associated with the set of elements using the identifiers. In some embodiments, the data sources 230 can be system behaviors, human behaviors, internet databases, and/or intranet databases. System behaviors can be how the system is performing (e.g. underperforming, faults, blind spots, performance metrics, and/or the like). Human behaviors can include instances when the system 100 has failed to determine a configuration for the environment and therefore needed human intervention to determine a best configuration.

Internet databases can be found using the unique identifier and/or type identifier to direct the information component 220 to websites, online manuals, product information databases, and/or the like. The internet databases can have information such as version logs, change logs, patches, updates, support information, end-of-life tracking, and/or the like. Intranet databases can include information managed by a system administrator and/or the like to include best practices for a company, internal rules, preferred vendors, client preferences, security requirements, government requirements, and/or the like.

The mapping component 110 includes a knowledgebase 240. The knowledgebase 240 compiles data from the determined data sources 230 associated with the set of elements. The knowledgebase 240 can prioritize compiling from data sources most relevant to the set of elements according to a predetermined prioritization or a learned prioritization.

The mapping component 110 includes a learning component 250. The learning component 250 analyzes information from the compiled data to facilitate determining the configuration. The learning component 250 can prioritize new information about the set of elements to facilitate determining a configuration. In some embodiments, the learning component 250 prioritizes relevant data that is pertinent to a newly diagnosed configuration. In other embodiments, the learning component 250 can prioritize changes in the data from the data sources regarding the elements such that diagnosis component 130 can easily know the differences for elements to diagnose a new configuration.

In some embodiments, the learning component 250 utilizes machine learning, artificial intelligence, deep learning intelligence techniques, and/or the like to further facilitate determining configurations. For example, a determined configuration may have failed in the execution phase by the implementation component 140. The failed configuration needed intervention by a system administrator to finish executing the configuration. The learning component 250 can learn the actions of the system administrator using machine learning such that future configurations do not fail.

Figure 3:
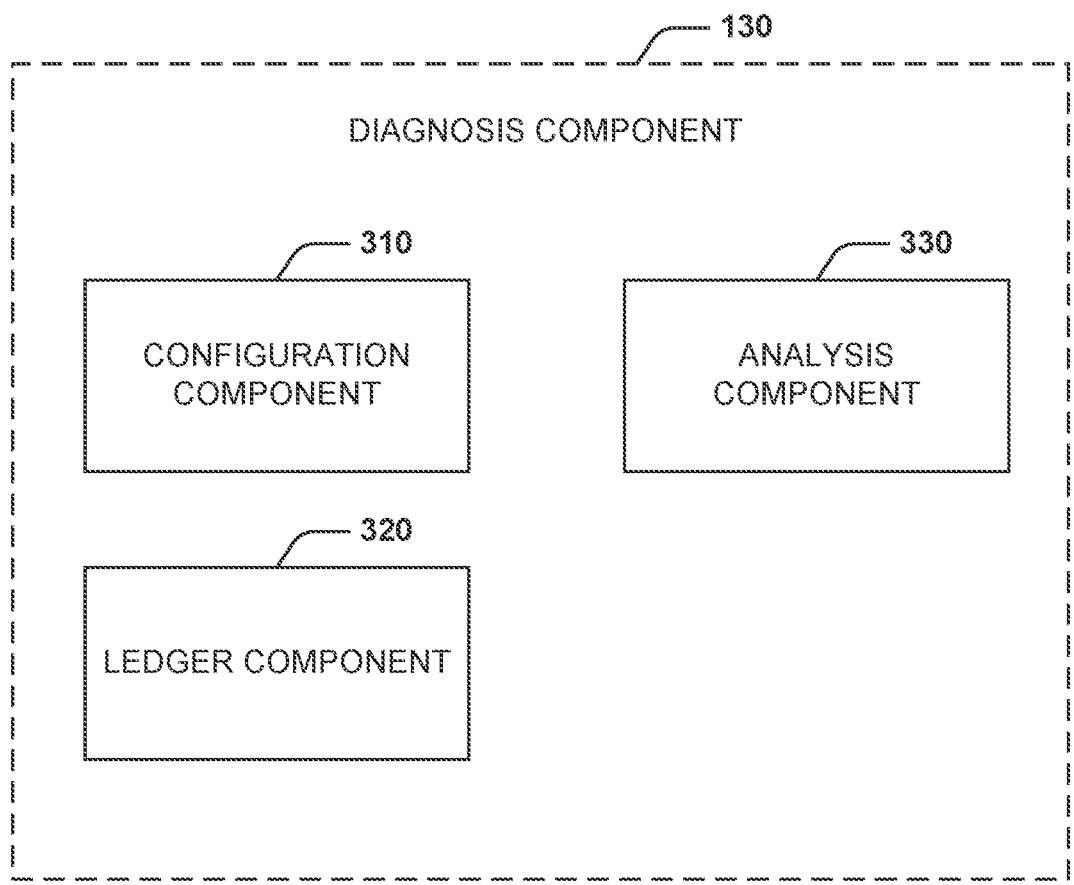
FIG. 3 illustrates an example component diagram of a diagnosis component.

FIG. 3 illustrates a detailed component diagram of a diagnosis component 130. The diagnosis component 130 includes a configuration component 310. The configuration component 310 determines a configuration for at least one element in the environment based on the mapping from the mapping component 110. In some embodiments, the configuration component 310 determines a configuration for the networked architecture 120. The configuration component 310 utilizes the analysis of the compiled data from the mapping component 110 to determine the configuration.

The configuration component 310 can determine configuration actions to be performed on an element or set of elements in the networked architecture 120. The configuration component 310 can determine an installation, an uninstallation, a replacement, an update, tune settings, other configuration functions, and/or the like. In some embodiments, the configuration component 310 determines a known configuration of at least one element in the set of elements from the learned information. The implementation component 140 deploys the known configuration to the element in the environment.

In other embodiments, the configuration component 310 can determine one or more sub-configurations for different elements in the environment. The configuration component 310 compiles the sub-configurations into a batched configuration for the set of elements. The implementation component 140 executes the batched configuration to the set of elements in the environment.

The diagnosis component 130 includes a ledger component 320 that determines an application ledger for a subset of elements of the set of elements. The application ledger is a distributed ledger and/or the like. For example, the application ledger can be a hashgraph or blockchain ledger. The application ledger can document previous or special configurations of an element in the environment.

The diagnosis component 130 includes an analysis component 330. From the ledger, the analysis component 330 determines unnecessary configurations based on the application ledger of the subset of elements. The analysis component 330 can block the unnecessary configuration for a specific element from the finalized configuration to be executed by the implementation component 140. For example, the mapping component 110 has determined a new version of a software element; however, the software element has a custom configuration recently deployed to the software element. The application ledger of the element shows that the configuration has been customized. The analysis component 330 determines that the version of the software element should not be included in the final configuration.

Figure 4:
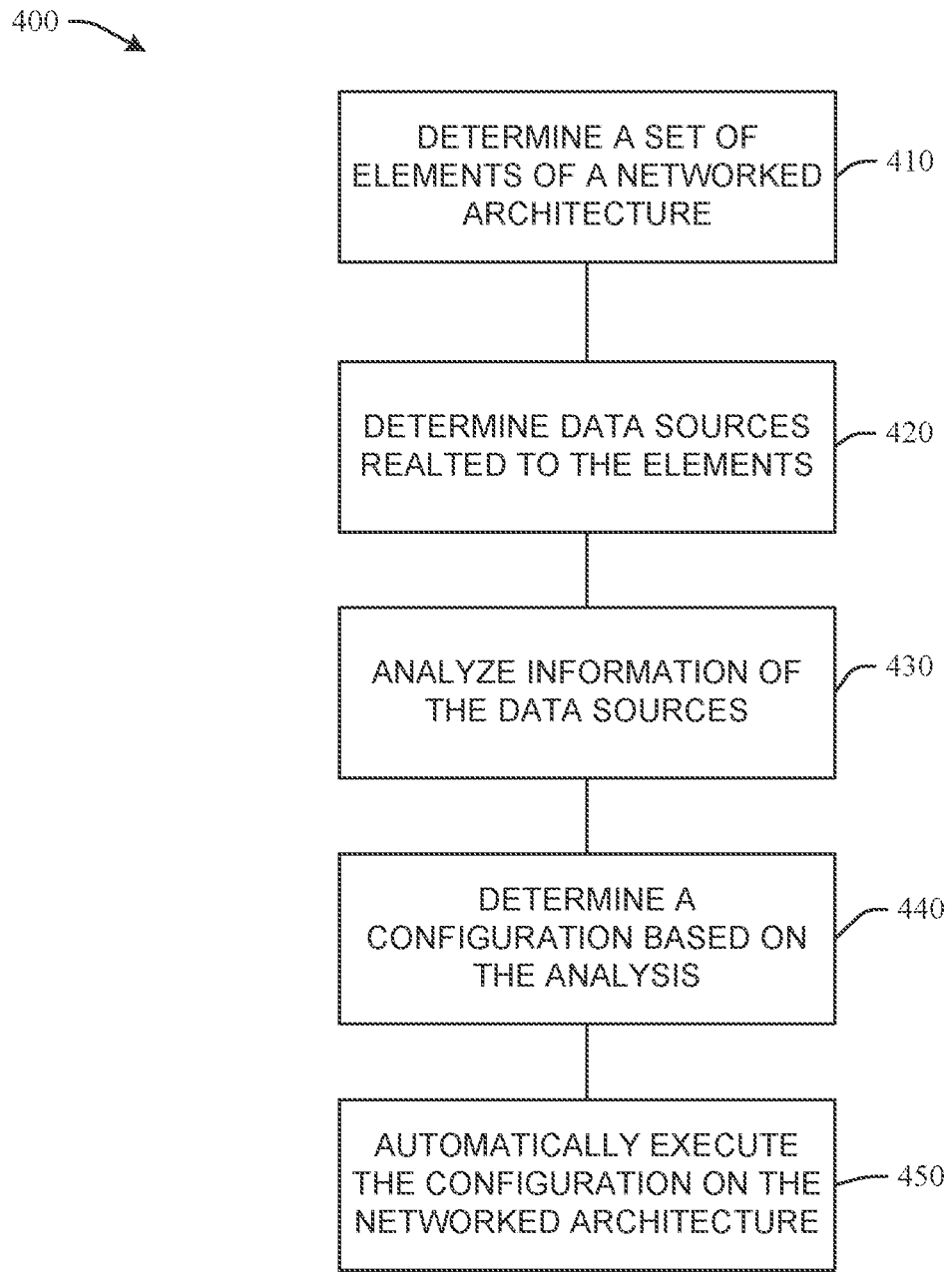
FIG. 4 illustrates a method for intelligent learning of architecture and environment management.

With reference to FIG. 4, example method 400 is depicted for intelligent learning of architecture and environment management. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

FIG. 4 illustrates a method 400 for intelligent learning of architecture and environment management. At 410, a set of elements of a networked architecture are determined. At 420, data sources are determined; the data sources are associated with the set of elements. At 430, information from the data sources are analyzed using machine learning techniques. At 440, a configuration is determined for the set of elements in the environment based on the analysis. At 450, the configuration is automatically executed based on the configuration.

Figure 5:
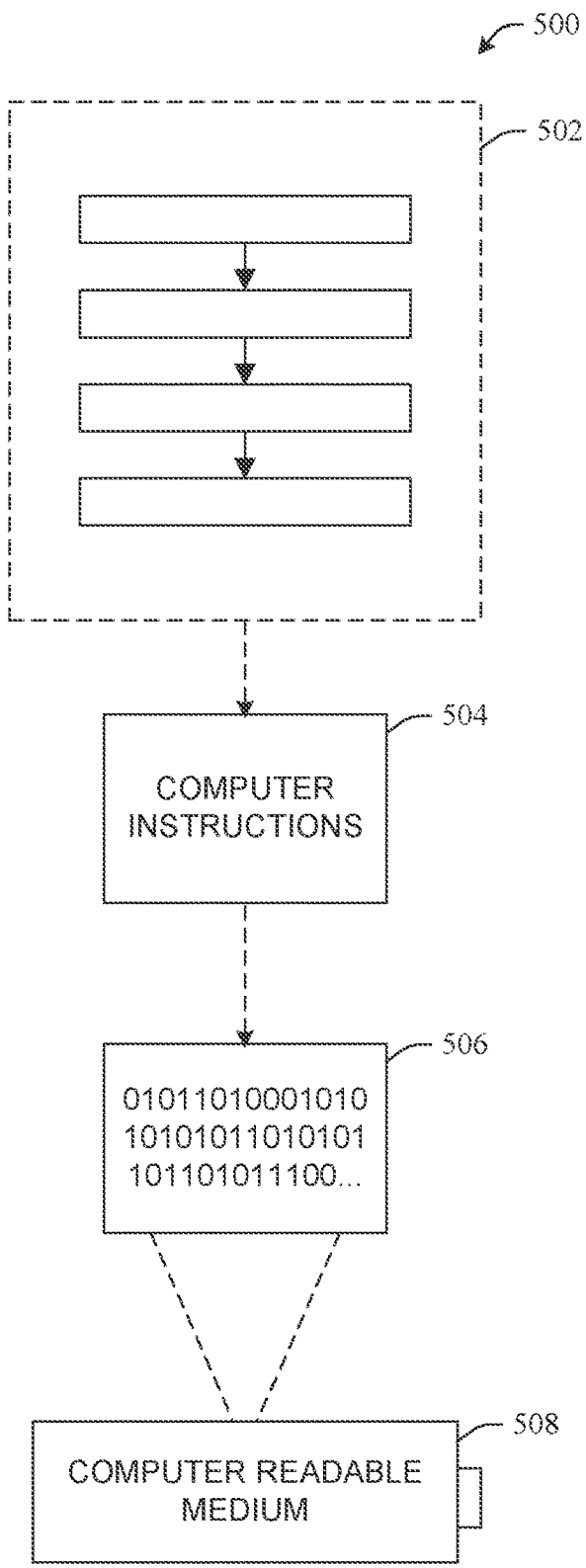
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
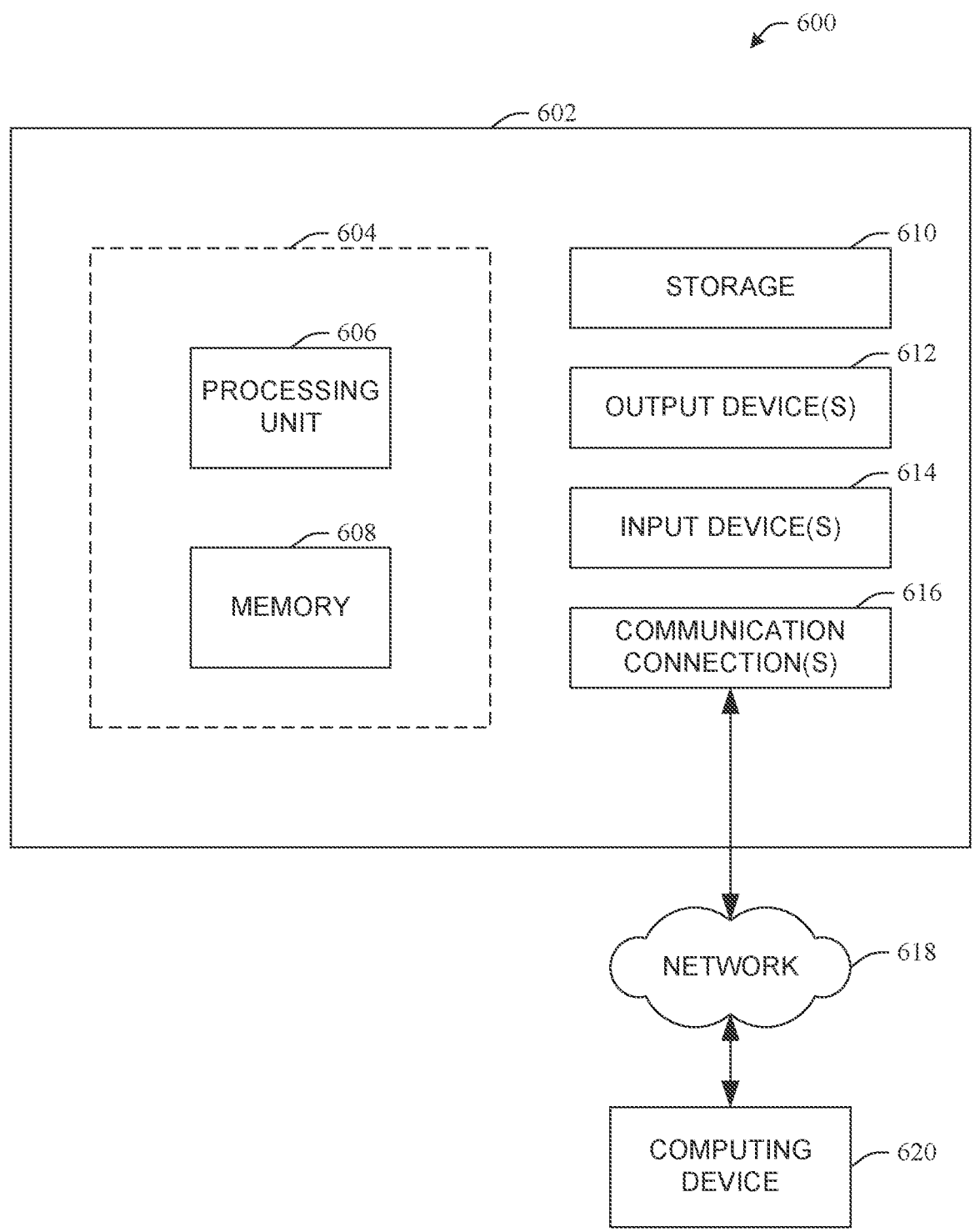
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable, and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising
mapping a network architecture comprising a set of software and hardware elements interconnected in a domain;
identifying a change to be made to the network architecture comprising a reconfiguration of a software element of the set of software and hardware elements;
determining an action to address a conflict associated with the change, wherein the action comprises removing the reconfiguration of the software element from the change to be made to the network architecture, wherein determining the action comprises determining, from an application ledger of a subset of the set of software and hardware elements, that a custom configuration has been deployed to the software element;
implementing the action on the network architecture; and
implementing the change to the network architecture.

2. The method of claim 1, further comprising identifying an update to one of the set of software and hardware elements as the change.

3. The method of claim 1, further comprising identifying a software patch as the change.

4. The method of claim 1, further comprising:
determining a negative impact on functionality of the network architecture associated with the change; and
automatically determining the action that mitigates the negative impact on the functionality of the network architecture.

5. The method of claim 1, wherein mapping the network architecture further comprises:
identifying the set of software and hardware elements; and
determining a current configuration of the set of software and hardware elements.

6. The method of claim 1, further comprising:
determining one or more data sources associated with the set of software and hardware elements; and
compiling data associated with one or more of the set of software and hardware elements from the one or more data sources.

7. The method of claim 6, further comprising determining one or more performance aspects of the network architecture based on compiled data and machine learning.

8. The method of claim 6, further comprising determining the action based on machine learning and compiled data associated with the one or more of the set of software and hardware elements.

9. A system, comprising:
a processor configured to:
map a network architecture comprising a set of software and hardware elements interconnected in a domain;
identify a change to be made to the network architecture comprising a reconfiguration of a software element of the set of software and hardware elements;
determine an action to address a conflict associated with the change, wherein the action comprises removing the reconfiguration of the software element from the change to be made to the network architecture, wherein determining the action comprises determining, from an application ledger of a subset of the set of software and hardware elements, that a custom configuration has been deployed to the software element;
implement the action on the network architecture; and
implement the change to the network architecture.

10. The system of claim 9, wherein the processor is further configured to identify an update to one of the set of software and hardware elements as the change.

11. The system of claim 9, wherein the processor is further configured to identify a software patch as the change.

12. The system of claim 9, wherein the processor is further configured to:
determine a negative impact on functionality of the network architecture associated with the change; and
automatically determine the action that mitigates the negative impact on the functionality of the network architecture.

13. The system of claim 9, wherein the processor is further configured to:
identify the set of software and hardware elements; and
determine a current configuration of the set of software and hardware elements.

14. The system of claim 9, wherein the processor is further configured to:
determine one or more data sources associated with the set of software and hardware elements; and
compile data associated with one or more of the set of software and hardware elements from the one or more data sources.

15. The system of claim 14, wherein the processor is further configured to determine one or more performance aspects of the network architecture based on compiled data and machine learning.

16. The system of claim 14, wherein the processor is further configured to determine the action based on machine learning and compiled data associated with the one or more of the set of software and hardware elements.

17. A non-transitory computer readable medium comprising program code that when executed by one or more processors is configured to cause the one or more processors to:

map a network architecture comprising a set of software and hardware elements interconnected in a domain;

identify a change to be made to the network architecture comprising a reconfiguration of a software element of the set of software and hardware elements;

determine an action to address a conflict associated with the change, wherein the action comprises removing the reconfiguration of the software element from the change to be made to the network architecture, wherein determining the action comprises determining, from an application ledger of a subset of the set of software and hardware elements, that a custom configuration has been deployed to the software element;

implement the action on the network architecture; and implement the change to the network architecture.

18. The non-transitory computer readable medium of claim 17, further comprising program code that when executed by the one or more processors is configured to cause the one or more processors to identify an update to one of the set of software and hardware elements as the change.

19. The non-transitory computer readable medium of claim 17, further comprising program code that when executed by the one or more processors is configured to cause the one or more processors to identify a software patch as the change.

20. The non-transitory computer readable medium of claim 18, further comprising program code that when executed by the one or more processors is configured to cause the one or more processors to:

determine a negative impact on functionality of the network architecture associated with the change; and automatically determine the action that mitigates the negative impact on the functionality of the network architecture.

* * * * *